United States Patent
Fox et al.

(10) Patent No.: US 6,901,135 B2
(45) Date of Patent: May 31, 2005

(54) SYSTEM FOR EXTENDING THE DYNAMIC GAIN OF AN X-RAY DETECTOR

(75) Inventors: Timothy R. Fox, Chicago, IL (US); David T. Nisius, Des Plaines, IL (US); Michael T. Duncan, Elgin, IL (US)

(73) Assignee: Bio-Imaging Research, Inc., Lincolnshire, IL (US)

( * ) Notice: Subject to any disclaimer, the term of this patent is extended or adjusted under 35 U.S.C. 154(b) by 0 days.

(21) Appl. No.: 10/651,272

(22) Filed: Aug. 28, 2003

(65) Prior Publication Data

US 2005/0047546 A1 Mar. 3, 2005

(51) Int. Cl.[7] .............................................. H05G 1/64
(52) U.S. Cl. .............................. 378/98.8; 250/370.11; 348/294
(58) Field of Search ............................ 378/98.8, 98.12, 378/91; 250/369, 366, 367, 370.01–371; 348/294

(56) References Cited

U.S. PATENT DOCUMENTS

| | | | |
|---|---|---|---|
| 4,700,233 A | * 10/1987 | Toshiaki | 348/294 |
| 4,815,118 A | 3/1989 | Acharya et al. | 378/19 |
| 4,945,243 A | 7/1990 | Arques | 250/367 |
| 5,220,589 A | 6/1993 | Gard | 378/19 |
| 5,831,269 A | * 11/1998 | Nakamura et al. | 250/367 |
| 6,005,908 A | * 12/1999 | Oppelt et al. | 378/19 |
| 6,175,658 B1 | * 1/2001 | Kump et al. | 382/266 |
| 6,278,115 B1 | * 8/2001 | Annis et al. | 250/363.01 |
| 6,418,185 B1 | 7/2002 | Besson et al. | 378/19 |
| 6,463,122 B1 | 10/2002 | Moore | 378/65 |
| 6,486,808 B1 | * 11/2002 | Seppi et al. | 341/139 |
| 6,553,094 B1 | 4/2003 | Bernardi et al. | 378/57 |
| 2003/0223532 A1 | * 12/2003 | Clinthorne et al. | 378/19 |

* cited by examiner

*Primary Examiner*—Craig E. Church
*Assistant Examiner*—Jurie Yun
(74) *Attorney, Agent, or Firm*—Welsh & Katz, Ltd.

(57) ABSTRACT

A method and apparatus are provided for extending a dynamic range of an X-ray imaging system. The method includes the steps of detecting a plurality of X-ray beams, amplifying each of the plurality of detected X-ray beams using a first gain value, amplifying each of the plurality of detected X-ray beams using a second gain value, and forming an X-ray image from the detected X-ray beams amplified by the first gain value and from the detected X-ray beams amplified by the second gain value.

29 Claims, 2 Drawing Sheets

SYSTEM FOR EXTENDING THE DYNAMIC GAIN OF AN X-RAY DETECTOR

FIELD OF THE INVENTION

The field of the invention relates to X-ray imaging and more particularly to the detection of X-rays for imaging.

BACKGROUND OF THE INVENTION

The use of X-rays for imaging is well known. Typically an X-ray source and detector are placed on opposing sides of the object to be imaged and the X-ray source is activated. X-rays passing through the object are detected and formed into an image.

The detection of X-rays may be accomplished using any of a number of methods. Under one method, X-ray film may be used as the X-ray detection device. In this case, a two-dimensional image may be formed by simply developing the image formed on the film by the X-rays passing through the object of interest.

Alternatively, the detection of X-rays may be accomplished with a one- or two-dimensional array of scintillating elements. As is known, a scintillating element functions to absorb X-ray energy and re-emit the energy in the form of lower-energy photons, typically in the visible light range. A photodetector is usually attached to an outer surface of the scintillator to detect the light produced by the interaction of the X-rays with the scintillator. The magnitude of the electrical signal from the photodetector (which is a function of the flux of X-rays that hit the detector element) is used to represent the detected X-ray signal.

The use of portable X-ray inspection systems for trucks is generally known. Such systems are typically used to perform non-invasive inspection of trucks for contraband (e.g., explosives, drugs, etc.). Often an X-ray beam is directed through the truck to a set of detectors on an opposing side.

As the radiation of the X-ray beam passes through the truck, the contents of the truck attenuate the beam based upon the density of the contents. Based upon the attenuation, an image may be formed of the truck's contents. By comparing a truck's manifest with the X-ray image, law-enforcement personnel may make a determination of whether on not they have probable cause to believe that any laws have been broken.

While portable X-ray imaging systems for trucks work well, they are difficult to use in some cases. For example, vehicle imaging systems are subject to a great deal of variation in signal levels. If the output of the X-ray source is adjusted to keep the signal passing through low density areas (e.g., air paths or with negligible material in the path of the beam) below the maximum level that the detector system is able to process, then the signal passing through other regions of the object (with a high density) may be too low to measure variations in that low-level signal. Without prior knowledge of the distribution of material in the object to be imaged, the power level setting of the X-ray source (and the detector full-scale level) is chosen based upon experience. If that setting is wrong, the process may need to be repeated. Because of the importance of vehicle inspection, a need exists for a better method of producing images from X-rays passing through vehicles.

SUMMARY

A method and apparatus are provided for extending a dynamic range of an X-ray imaging system. The method includes the steps of detecting a plurality of X-ray beams, amplifying each of the plurality of detected X-ray beams using a first gain value and amplifying each of the plurality of detected X-ray beams using a second gain value. The two signals amplified from each of the plurality of X-ray beams are measured at the same location. The method also includes the step of forming an X-ray image from the detected X-ray beams amplified by the first gain value and from the detected X-ray beams amplified by the second gain value.

DETAILED DESCRIPTION OF AN ILLUSTRATED EMBODIMENT

Figure 1:
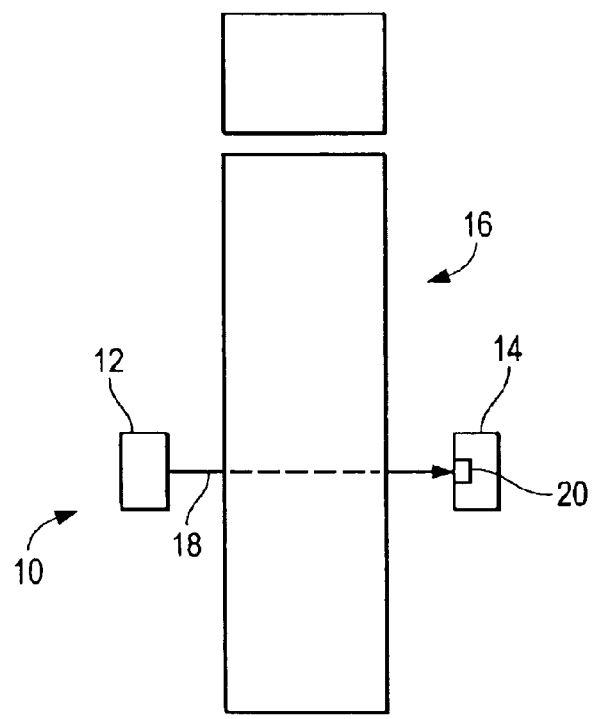
FIG. 1 is a block diagram of a vehicle imaging system in accordance with an illustrated embodiment of the invention.

FIG. 1 is a block diagram of an X-ray vehicle imaging system 10 shown in a context of use, generally in accordance with an illustrated embodiment of the invention. The imaging system 10 may be used for digital radiography (DR) in the non-invasive inspection of trucks 16 for contraband (e.g., explosives, drugs, etc.). While the imaging system 10 will be described in the context of radiography, it should be understood the concepts described herein are also intended to cover computed tomography and laminography.

While the imaging system 10 will be described in the context of truck inspection, it should be understood that the system 10 may also be used for the non-invasive inspection of many other things. For example, the features of the system 10 that are described below also allow the system 10 to be easily used for the inspection of automobiles, railcars, barges, shipping containers or even luggage.

As the radiation of the X-ray beam 18 passes through the truck, the contents of the truck attenuate the beam based upon the density of the truck's contents. The attenuated X-ray beams may then be measured and used to form an image of the content of the truck 16.

One difficulty with prior art truck inspection systems is that trucks typically carry loads with a wide variety of densities. For example one truck may be carrying ping-pong balls whereas another truck may be a tanker carrying water or fuel. However, in either case, the truck carrying ping-pong balls, water or fuel could also be carrying explosives or other contraband. Because of this possibility, a vehicle imaging system must be capable of working equally well with ping-pong balls as with water.

Also, in any given truck, some of the X-ray beams may pass through air or through only very thin walls of the truck's trailer, which have negligible attenuation and the detected signals are very high, while other X-ray beams may pass through very dense portions of the trailer's load. Therefore, on a given truck the range of detected signals from maximum to minimum can be very high if the truck includes regions of high attenuation.

Because of the wide variability in density, the imaging system 10 is capable of operating automatically over a wide dynamic range. More to the point, the truck imaging system 10 may be capable of operating without (or with only minimal) saturation of the detection system in the case of an empty truck where a detector array 14 of the imaging system 10 is subject to virtually the full power of the X-ray source 12.

Alternatively, the imaging system 10 may also be capable of providing discernable images through an appropriate thickness of water or fuel (e.g., 8 foot). In these cases, the dynamic range could be expected to be relatively large (e.g., 1:30,000). The imaging system 10 may also be capable of providing discernable images of objects obscured by thick metal objects that overlap the objects of interest in the image. In this case, as well as in the liquid case above, the required information is represented by small variations in an already small signal level.

In order to form an effective image of the truck's content, the source 12 and detector 14 may be provided with an effective coverage area that envelopes a height of the truck 16. The detector 14 may include an array of detector elements 20 in the vertical direction appropriate for the resolution and height desired. In effect, the X-ray source 12 may be thought of as simultaneously generating a number of X-ray beams detected by respective X-ray detectors 20. In one particular embodiment, the detector elements 20 may be provided with a pitch (center to center spacing) of 4.6 mm in the vertical direction.

The detector 14 may be provided with a single vertical column of detector elements 20 or with an appropriate number of columns (e.g., 2, 3, etc.). The collection of information in the horizontal direction may be aided by either allowing the truck 16 to slowly drive through an imaging field of the imaging system 10 or by moving the imaging system 10 along the length of the parked truck.

Figure 2:
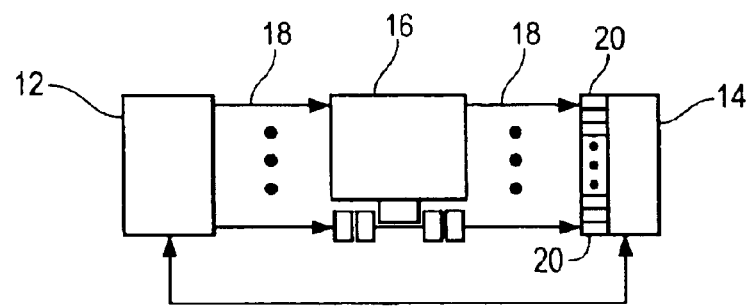
FIG. 2 is a side view of the imaging system of FIG. 1.

The X-ray source 12 may include a number of X-ray sources to provide a substantially parallel imaging path through the truck (as suggested by FIG. 2) or may be a single X-ray source. Where a single X-ray source is involved, it would be expected that the X-ray beam would be of the fan-beam variety with sufficient spacing between the source 12 and detector 14 to allow full coverage of the height of the truck 16. Alternatively, two X-ray sources could be mounted with the center of their emission beams approximately perpendicular, to see simultaneous images of the top view and side view of the truck. In this case, each X-ray source would have its own detector array, and each array produces an image from different points of view.

Alternatively, smaller sources 12 and detectors 14 may be used. In this case, the area of the truck that can be seen in any one instant with the smaller system is smaller than the required region. In the limiting case, the pencil beam defined by a single source and one small detector could be scanned in two dimensions to cover the entire region in a longer time than taken with a one-or two-dimensional array of detectors. In the case of smaller X-ray systems, it would be expected that the source and detector would scan in the vertical as well as the horizontal direction in order to form images of the entire volume of the truck 16.

Figure 3:
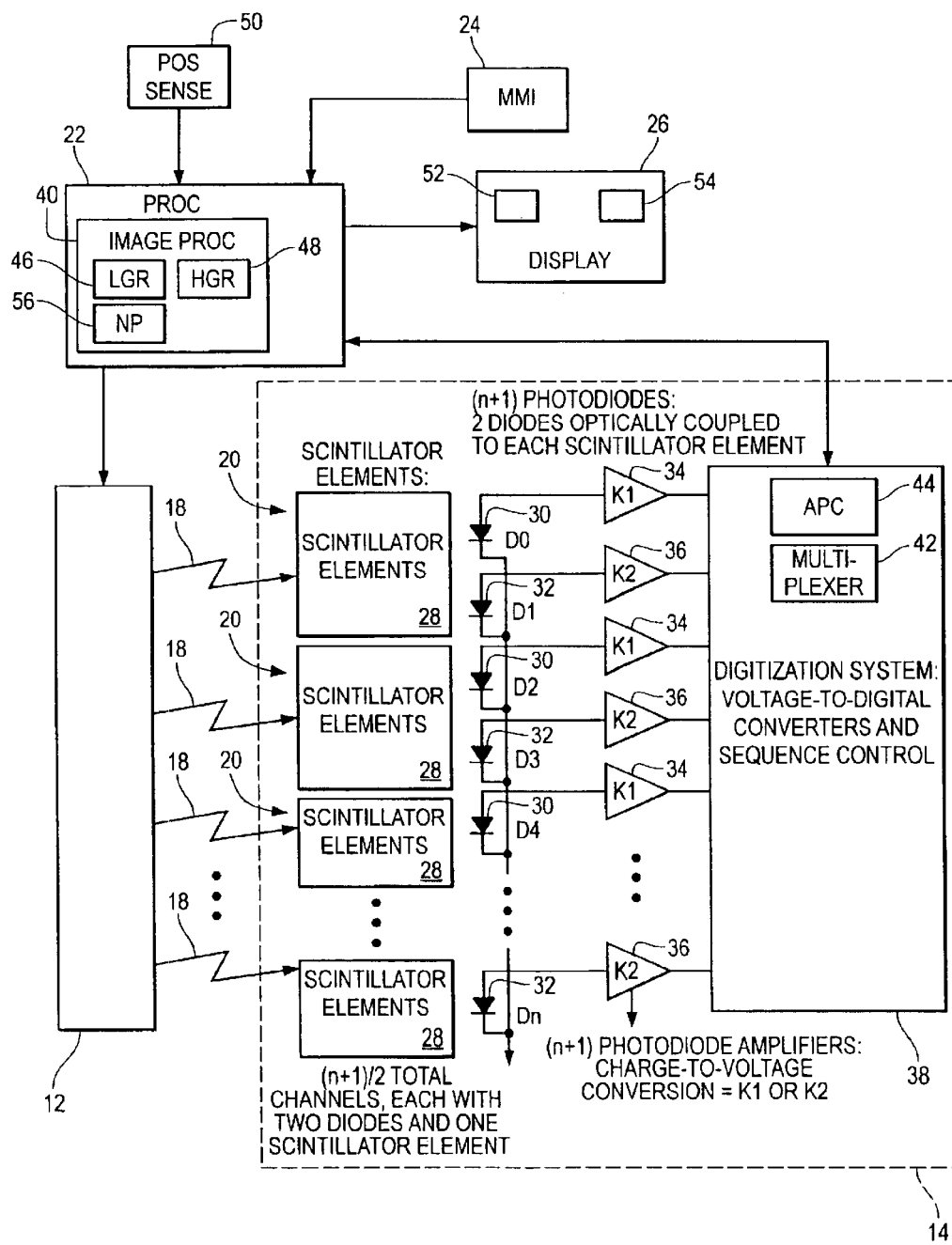
FIG. 3 is a block diagram of the imaging system of FIG. 1.

Turning now to the imaging system 10 in specific, FIG. 3 is a block diagram that shows additional details of the imaging system 10. As shown, a processor 22 may be provided for purposes of controlling the system 10. A man-machine interface (MMI) (e.g., a keyboard) 24 may be provided for entry of commands or operating parameters into the processor 22. A display 26 may be provided for image display.

Each detector element 20 may include a scintillating element 23 and a pair of associated photodetectors 30, 32. The scintillating elements 28 may be of an appropriate material (e.g., a single crystal, polycrystalline, ceramic, plastic, etc.) with a depth appropriate for the energy level of the source 12 (e.g., 6 MV).

Each scintillating element 28 functions to convert impinging X-rays (i.e., an X-ray beam) into visible or near-visible light. For convenience, the visible or near-visible light will be referred to as the converted X-ray beam. The converted X-ray beam may then be detected within the pair of detectors 30, 32.

The pair of photodetectors 30, 32 may be coupled to an associated amplifier 34, 36 and function to collect substantially identical samples of the same X-ray beam. Under one illustrated embodiment, a first amplifier 34 of each detector element 20 provides a first gain value, K1, and the second amplifier 36 provides a second gain value, K2. Under the embodiment, the gain of the first amplifier 34 may be eight times the gain of the second amplifier 34, 34 of each element 20.

In use, an image processor 40 may periodically collect samples from the first and second amplifiers 34, 36 of each element 20. To collect a reading, the processor 40 may activate the source 12 and instruct the detector 14 to collect readings. A digitization system 38 may sequentially connect each of the amplifiers 34, 36 to an analog to digital converter (ADC) 44 via a multiplexer 42. The converted samples may be saved in a respective file 46, 48 along with vertical and horizontal position information. The vertical position information may include an identifier of the element 20 providing the reading and possibly a vertical position of the detector array 14. Normally, all detectors acquire X-ray signal at the same time, to avoid differences in imaged subject matter caused by motion of the truck. In this case, both readings from each detector are acquired during the same time interval, which is the same time interval for the readings from all other detectors. Alternatively, the readings from the pairs of detectors may be staggered in time, so that the start and end times of the collection cycle start and end later for each detector pair as they are read out. In that case, the two readings from each detector can be read simultaneously, or slightly offset in time by being read out in adjacent time slots to minimize the position difference between the two readings.

The horizontal position information may be provided by a position sensor 50. Alternatively, the relative position of the truck with respect to the scanner may be determined by relying on a constant velocity of the truck with respect to the scanner, and collecting the detector data at constant time intervals, which correspond to constant position intervals.

The position sensor 50 may provide an indication of the position of the truck 16 relative to the system 10. The position sensor 50 may be calibrated in feet and inches and may be an optical encoding device that provides information about the location on the truck 16 (i.e., along the length of the truck) where each sample was obtained. The position sensor 50 may also be used as a source to provide information on elevation in the case where the source 12 and detector 14 scan the truck 16 in a vertical direction.

In the case where the imaging system 10 moves along a stationary truck, the position sensor 50 may be coupled to the drive system that moves the source 12 and detector 14 along the length of the truck. In the case where the truck 16 moves, the position sensor 50 may be a radar or acoustic ranging device that measures truck position relative to the imaging system 10.

The processor 40 may display images of the truck 16 in real-time as the truck 16 moves through the imaging system 10. Alternatively, the processor 40 may store the samples for later viewing or as evidence. Where stored, samples from the lower gain amplifiers 36 may be stored in a low-gain file 46 and the samples from the high-gain amplifiers 34 may be stored in a high-gain file 48.

In use, the processor 38 may display two images 52, 54 on a display 26. The images 52, 54 may be reconstructed from the sample values based upon the vertical position of the element 20 within the array 14 (and the elevation of the array 14 in the case where the array 14 is Moveable) and from the longitudinal information provided by the position sensor 50.

The first image 52 may be limited to samples from the low-gain amplifiers 36 and the second image 54 say be limited to corresponding samples from the high gain amplifiers 34. Each set of image& 52, 54 may be formed from a single imaging location of the truck showing the same view (albeit with different levels of amplification).

Alternatively, samples from the low and high-gain amplifiers 34, 36 may be integrated into the same image based upon a color-coding arrangement. For example, pixels that display samples from the low-gain amplifiers 36 may be displayed as a gray-scale image where intensity of the detected X-rays is indicated by the brightness of the pixel. In contrast, pixels that display samples from the high-gain amplifiers 34 may be displayed with a blue background where intensity is again indicated by color intensity.

To select the appropriate sample, the processor 38 may compare each sample from the amplifiers 34, 36 of each detector element 20 with a not of threshold values. An upper threshold for the high-gain amplifiers 34 may be set at a saturation value for that amplifier. When the processor 40 detects saturation of the high-gain amplifier, the processor 40 say simply substitute a value from the low-gain amplifier in the appropriate pixel position along with a gain indicator (gray-scale brightness) indicating the amplification level. Alternatively, a single grey-scale image can be formed by normalizing the values from the high and low-gain amplifiers. The values may be normalized against a predetermined pixel display range by a normalizing processor 56 using a suitable algorithm to combine the high-gain and low-gain values for each detector sample into a single value for that pixel in the image. At high signal values, the high-gain value is not valid, due to saturation, and the algorithm does not use the high-gain value for signal values above a certain threshold. At high signal values, the algorithm output value is only a function of the low-gain value. At very low signal values, the low-gain value is still valid, but the high-gain value is a better measure of the low signal value, and the algorithm output value is only a function of the high-gain value. At intermediate values, the algorithm can abruptly switch from the high-gain value to a multiple of the low gain value as the signal value increases, or a more smooth transition can be made using a weighted sum of the two values.

Where the signal level from the high-gain amplifier 34 falls below the saturation threshold, the high-gain pixel may be, again, substituted into the image. In each case, the operator is alerted to the gain based upon the background color or the pixel.

The use of the dual amplification system allows a operator to automatically see images under conditions that would not have been possible under the prior art. In cases of a vehicle with a low-density material, the low gain image would provide complete imaging information of the vehicle. Similarly, the high gain image would provide complete imaging information of vehicles with dense loads.

Further, the presence of two images would allow the operator to easily examine dense areas adjacent to non-dense areas without adjusting an overall system gain. For example, it would be well recognized in the art that even if the overall gain of the detectors 14 could be easily controlled, the result would either be a good image of dense areas or a good picture of non-dense areas. The difficulty for the operator, of course, is that if a weapon were to extend from a dense area into a non-dense area, the operator would not be able to see the entire weapon at the same time and would be more likely to miss important details.

The presence of two images allows the operator to compare images to look for an indication of any contraband. Further, the operator may combine the images (using the color coding arrangement discussed above) to further correlate the outlines and appearance of potential contraband.

A specific embodiment of a method and apparatus for expanding a dynamic range of an X-ray imaging system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

What is claimed is:

1. A method of extending a dynamic range of an X-ray imaging system, such method comprising the steps of:
    detecting first and second substantially identical samples of each of a plurality of X-ray beams;
    amplifying each first sample of the substantially identical samples using a first gain value;
    amplifying each second sample of the substantially identical samples using a second gain value; and
    forming an X-ray image from the detected X-ray beams amplified by the first gain value and from the detected X-ray beams amplified by the second gain value.

2. The method of extending a dynamic range of an X-ray imaging system as in claim 1 wherein the step of detecting the plurality of X-ray beams further comprises providing a scintillating element for converting each of the plurality of X-ray beams into visible or near-visible light.

3. The method of extending a dynamic range of an X-ray imaging system as in claim 2 further comprising disposing first and second photodiodes on each scintillating element for detecting the visible or near-visible light from the scintillating element.

4. The method of extending a dynamic range of an X-ray imaging system as in claim 1 further comprising forming a first X-ray image from the detected X-ray beams amplified by the first gain value and a second X-ray image from the detected X-ray beams amplified by the second gain value.

5. The method of extending a dynamic range of an X-ray imaging system as in claim 1 further comprising forming a single X-ray image from the detected X-ray beams amplified by the first gain value and from the detected X-ray beams amplified by the second gain value.

6. The method of extending a dynamic range of an X-ray imaging system as in claim 5 further comprising displaying pixels from the detected X-ray beams amplified by the first gain value with a first color value and pixels from the detected X-ray beams amplified by the second gain value using a second color value.

7. The method of extending a dynamic range of an X-ray imaging system as in claim 5 further comprising displaying pixels from the detected X-ray beams amplified by the first and second gain values normalized to a single gray-scale pixel range.

8. An apparatus for extending a dynamic range of an X-ray imaging system, such apparatus comprising:
- means for detecting first and second substantially identical samples of a plurality of X-ray beams;
- means for amplifying each first sample of the substantially identical samples using a first gain value;
- means for amplifying each second sample of the substantially identical samples using a second gain value; and
- means for forming an X-ray image from the detected X-ray beams amplified by the first gain value and from the detected X-ray beams amplified by the second gain value.

9. The apparatus for extending a dynamic range of an X-ray imaging system as in claim 8 wherein the means for detecting the plurality of X-ray beams further comprises means for converting each of the plurality of X-ray beams into visible or near-visible light.

10. The apparatus for extending a dynamic range of an X-ray imaging system as in claim 9 wherein the means for converting each of the plurality of X-ray beams into near visible or near-visible light further comprises a scintillating element.

11. The apparatus for extending a dynamic range of an X-ray imaging system as in claim 10 wherein the scintillating element further comprises a single crystal or a polycrystalline material.

12. The apparatus for extending a dynamic range of an X-ray imaging system as in claim 10 wherein the scintillating element further comprises a ceramic material.

13. The apparatus for extending a dynamic range of an X-ray imaging system as in claim 10 wherein the scintillating element further comprises plastic.

14. The apparatus for extending a dynamic range of an X-ray imaging system as in claim 9 further comprising means for detecting the visible light disposed on the means for converting.

15. The apparatus for extending a dynamic range of an X-ray imaging system as in claim 8 further comprising means for forming a first X-ray image from the detected X-ray beams amplified by the first gain value and a second X-ray image from the detected X-ray beams amplified by the second gain value.

16. The apparatus for extending a dynamic range of an X-ray imaging system as in claim 8 further comprising means for forming a single X-ray image from the detected X-ray beams amplified by the first gain value and from the detected X-ray beams amplified by the second gain value.

17. The apparatus for extending a dynamic range of an X-ray imaging system as in claim 16 further comprising means for displaying pixels from the detected X-ray beams amplified by the first gain value with a first color value and pixels from the detected X-ray beams amplified by the second gain value using a second color value.

18. An apparatus for extending a dynamic range of an X-ray imaging system, such apparatus comprising:
- a detector array adapted to detect first and second substantially identical samples of each of a plurality of X-ray beams;
- a first amplifier adapted to amplify each first sample of the substantially identical samples using a first gain value;
- a second amplifier adapted to amplify each second sample of the substantially identical samples using a second gain value; and
- an image processor adapted to form an X-ray image from the detected X-ray beams amplified by the first gain value and from the detected X-ray beams amplified by the second gain value.

19. The apparatus for extending a dynamic range of an X-ray imaging system as in claim 18 wherein the detector array further comprises a scintillating element adapted to convert each of the plurality of X-ray beams into visible or near-visible light.

20. The apparatus for extending a dynamic range of an X-ray imaging system as in claim 19 wherein the scintillating element further comprises a single crystal or a polycrystalline material.

21. The apparatus for extending a dynamic range of an X-ray imaging system as in claim 19 wherein the scintillating element further comprises a ceramic material.

22. The apparatus for extending a dynamic range of an X-ray imaging system as in claim 19 wherein the scintillating element further comprises plastic.

23. The apparatus for extending a dynamic range of an X-ray imaging system as in claim 19 further comprising a first photodiode and a second photodiode disposed on the scintillating element for detecting the visible or near-visible light.

24. The apparatus for extending a dynamic range of an X-ray imaging system as in claim 18 further comprising a first X-ray image for displaying information from the detected X-ray beams amplified by the first gain value and a second X-ray image for displaying information from the detected X-ray beams amplified by the second gain value.

25. The apparatus for extending a dynamic range of an X-ray imaging system as in claim 18 further comprising an image processor adapted to form a single X-ray image from the detected X-ray beams amplified by the first gain value and from the detected X-ray beams amplified by the second gain value.

26. The apparatus for extending a dynamic range of an X-ray imaging system as in claim 25 wherein the single X-ray image further comprises pixels from the detected X-ray beams amplified by the first gain value with a first color value and pixels from the detected X-ray beams amplified by the second gain value using a second color value.

27. The apparatus for extending a dynamic range of an X-ray imaging system as in claim 25 wherein the image processor further comprises a normalizing processor adapted to normalize the detected X-ray beams amplified by the first and second gain values to a predetermined pixel range.

28. A method of extending a dynamic range of an X-ray imaging system, such method comprising the steps of:
- detecting first and second substantially identical samples of a non-coincident portion of an X-ray beam within each of a plurality of regularly spaced detector areas;
- amplifying each of the plurality of detected portions using a first gain value for the first samples of the substantially identical samples and using a second gain value for the second samples of the substantially identical samples; and
- forming an X-ray image from the amplified portions at the first gain value and from the amplified portions at the second gain value.

29. A method of extending a dynamic range of an X-ray detector, such method comprising the steps of:
- providing an X-ray to optical converter;
- coupling a first detector of a first gain value to the converter;
- coupling a second detector of a second gain value to the converter; and
- selectively coupling the first and second detectors to an image reconstruction processor based upon a magnitude of an X-ray signal impinging upon the converter.

* * * * *

UNITED STATES PATENT AND TRADEMARK OFFICE
CERTIFICATE OF CORRECTION

PATENT NO. : 6,901,135 B2  
DATED : May 31, 2005  
INVENTOR(S) : Timothy R. Fox et al.

It is certified that error appears in the above-identified patent and that said Letters Patent is hereby corrected as shown below:

<u>Title page,</u>
Item [75], Inventors, change "Michael T. Duncan" to -- Michael Z. Duncan --.

Signed and Sealed this

Thirtieth Day of August, 2005

JON W. DUDAS  
*Director of the United States Patent and Trademark Office*